United States Patent [19]
Go

[11] Patent Number: 5,363,145
[45] Date of Patent: Nov. 8, 1994

[54] DETECTING METHOD OF START SIGNAL OF GHOST CANCELLING REFERENCE SIGNAL AND CIRCUIT THEREOF

[75] Inventor: Do-Young Go, Anyang-city, Rep. of Korea

[73] Assignee: Samsung Electronics Co., Ltd., Kyungki-Do, Rep. of Korea

[21] Appl. No.: 70,938

[22] Filed: Jun. 4, 1993

[30] Foreign Application Priority Data

Jun. 4, 1992 [KR] Rep. of Korea ................... 92-9668

[51] Int. Cl.$^5$ ............................................. H04N 5/21
[52] U.S. Cl. ...................................... 348/614; 348/622
[58] Field of Search .................. 358/167, 36, 905; 348/607, 614, 608, 611, 622; H04N 5/21

[56] References Cited

U.S. PATENT DOCUMENTS

| | | | |
|---|---|---|---|
| 5,144,414 | 9/1992 | Mishi et al. | 358/905 |
| 5,210,607 | 5/1993 | Sakamoto et al. | 358/167 |

FOREIGN PATENT DOCUMENTS

| | | | |
|---|---|---|---|
| 3048579 | 3/1991 | Japan | H04N 5/21 |
| 4070064 | 3/1992 | Japan | H04N 5/21 |

*Primary Examiner*—Mark R. Powell
*Assistant Examiner*—Jeffrey Murrell
*Attorney, Agent, or Firm*—Sughrue, Mion, Zinn, Macpeak & Seas

[57] ABSTRACT

A method and apparatus for cancelling a ghost generated during a transmission of a video signal in a multipath channel, which can accurately detect the start signal of the ghost cancelling reference signal at a receiving end when the ghost cancelling reference signal and a pedestal signal are inserted at a transmitting end into an 8-field to thereby be continuously transmitted.

10 Claims, 5 Drawing Sheets

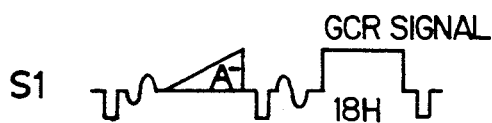
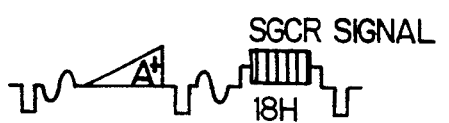
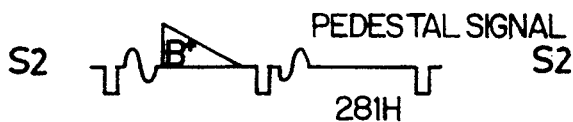
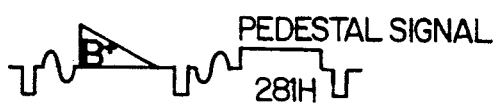
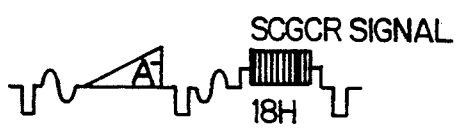
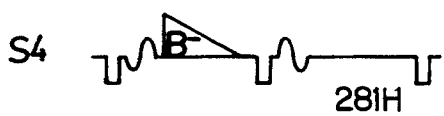
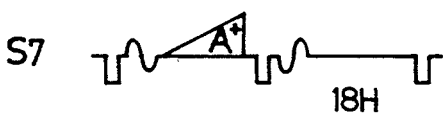
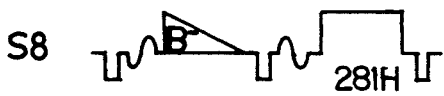
$$\left(\begin{array}{c} S_{gcr} = 1/4\{(S1-S5)+(S6-S2) \\ +(S3-S7)+(S8-S4)\} \end{array}\right)$$
$$\left(\begin{array}{c} S_{sgcr} = \{(S1-S5)+(S6-S2)\}/2 \\ S_{scgcr} = \{(S3-S7)+(S8-S4)\}/2 \end{array}\right)$$

DETECTING METHOD OF START SIGNAL OF GHOST CANCELLING REFERENCE SIGNAL AND CIRCUIT THEREOF

BACKGROUND OF THE INVENTION

Field of the Invention

The present invention relates to a method of cancelling a ghost generated during a transmission of a video signal in a multi-path channel, and more particularly to a detecting method for detecting a start signal of a ghost cancelling reference signal (hereinafter referred to as "GCR" signal) and a circuit therefor which can accurately detect the start signal of the GCR signal at a receiving end when the GCR signal and a pedestal signal, at a transmitting end, are inserted into an 8-field to thereby be continuously transmitted. The present disclosure is based on the disclosure of Korean Patent Application No. 92-9668 filed Jun. 4, 1992.

BACKGROUND OF THE INVENTION

When a television video signal is transmitted via two or more paths, radio waves received at various angles vary in arrival times due to reflection of the waves and the like, and accordingly, images formed on the television appear in a multiplex overlap, which is generally referred to as a ghost.

In order to cancel the ghost, when the GCR signal is transmitted from the transmitting end, the transmitted GCR signal (which includes the ghost and noise) is detected to thereby be compared with a GCR signal obtained at the receiving end, so that a channel characteristic (the distance and magnitude between an original pictorial signal and the ghost) can be ascertained.

Therefore, if an inverse transfer function for the channel characteristic thus ascertained can be evaluated, the ghost resulting from the multi-path channel can be cancelled.

However, if the transmitted GCR signal is distorted by noise, there is no way to detect the transmitted GCR signal. This results in the GCR signal and pedestal signal being transmitted continuously to the 8-field from the transmitting end.

Likewise, the receiving end processes (e.g., adds or subtracts) the received signals to thereby remove the influence of the noise, so that only a distortion by way of the multi-path channel can be obtained to thereby cancel the noise.

This kind of method is referred to as an 8-field sequence transfer method.

FIG. 1A is a waveform drawing for illustrating a transfer state of the 8-field continuous GCR signal under a so-called Broadcasting Station Associated Standard enforced in Japan, in which a continuous transfer per every field is made in an order of S1 (GCR signal), S2 (pedestal signal), S3 (GCR signal), S4 and S5 (pedestal signals), S6 (GCR signal), S7 (pedestal signal), and S8 (GCR signal).

An average GCR signal can be obtained by the following formula (1):

$$Sgcr = \tfrac{1}{4}\{(S1-S5)+(S6-S2)+(S3-S7)+(S8-S4)\} \quad \text{Formula (1)}$$

A waveform of the GCR signal obtained by the above formula (1) is illustrated in FIG. 2A.

FIG. 1B is another waveform drawing for illustrating a transfer state of the 8-field continuous GCR signal wherein it can be noted that two types of GCR signals and one pedestal signal are transmitted. Specifically, a SGCR signal, a SCGCR signal and a pedestal signal are transmitted.

In FIG. 1B, a continuous transfer per every field is done in an order of S1 (SGCR signal), S2 (pedestal signal), S3 (SCGCR signal), S4 and S5 (pedestal signals), S6 (SGCR signal), S7 (pedestal signal) and S8 (SCGCR signal).

The two types of average GCR signals can be obtained in the following formulae.

$$Ssgcr = \{(S1-S5)+(S6-S2)\}/2 \quad \text{Formula (2)}$$

$$Sscgcr = \{(S3-S7)+(S8-S4)\}/2 \quad \text{Formula (3)}$$

The Ssgcr signal and Sscgcr signal obtained by the above formulae (2) and (3) are illustrated in FIG. 2B.

FIGS. 3A–3C are enlarged drawings of waveforms for the GCR signal and pedestal signal illustrated in FIG. 1B, wherein FIG. 3A is an enlarged waveform drawing of the SCGCR signal, FIG. 3B is an enlarged waveform drawing of the SGCR signal and FIG. 3C is an enlarged waveform drawing of the pedestal signal. As seen in FIGS. 3A–3C, the shapes of the SCGCR signal and SGCR signal are identical, and the two signals differ only in polarity.

When the 8-field continuous transfer is utilized, and because the signals as illustrated in FIGS. 1A and 1B (S1–S8) are continuously transferred per every field, an average GCR signal can be obtained by applying the aforesaid formulae (1) or (2) or (3), only when it is known which field signal out of the signals is a start signal (S1) of the GCR signal.

FIGS. 4A–4C are waveform drawings for explaining a conventional method of discriminating a GCR signal, wherein a threshold is taken after a signal, continuous in every field, has been read. In other words, it has been discriminated that in a field where a signal having a high threshold as in FIG. 4A exists, there exists a GCR signal, and in a field where a signal having a low threshold as in FIG. 4B exists, there exists a pedestal signal, and the GCR signal and pedestal signal are obtained from the continuous field, so that the start signal S1 of the GCR signal can be discriminated by using a program of a microprocessor.

The GCR signal illustrated in FIG. 1B is taken for example.

Assume that the SGCR signal is 1, the SCGCR signal is 1' and the pedestal signal is 0, and the signals obtained from the continuous fields have been detected in shapes of 01' 101' 00101' 101' (see S7, S8, S1, S2 ... and so forth in FIG. 1B), then the microprocessor has discriminated through its programming, the 1 signal as coming in at the third position as the start signal S1 of the GCR signal, to thereby obtain an average SGCR signal and average SCGCR signal. However, when there is a big ghost, there are cases when an amplitude of the transmitted signal changes.

In other words, as illustrated in FIG. 4C, there is a drawback in that the pedestal signal can be erroneously detected as the GCR signal or the GCR signal can be erroneously detected as the pedestal signal.

SUMMARY OF THE INVENTION

Accordingly, the present invention has been developed to solve the aforementioned problems. It is an object of the present invention to provide a method for detecting a start signal of a ghost cancelling reference signal and a circuit therefor which can accurately detect an 8-field continuous GCR signal to thereby cancel the ghost signal.

In accordance with one aspect of the present invention, there is provided a method of detecting a start signal of the ghost cancelling reference signal comprising the steps of: obtaining differential values of received GCR signals and differential values of pedestal signals to thereby compare same with predetermined thresholds (first process); and discriminating a GCR signal as a comparison result of the above obtaining step when a period during which the differential values are larger than the thresholds is over a predetermined period (second process).

In accordance with another aspect of the present invention there is provided a detecting circuit for detecting a start signal of a ghost cancelling reference signal comprising: means for obtaining differential values of received GCR signals and differential values of pedestal signals to thereby compare same with predetermined thresholds (first means); and means for discriminating a GCR signal to thereby output a GCR detecting signal as a comparison result of the obtaining means when a period during which the differential values are larger than thresholds is over a predetermined period (second means).

BRIEF DESCRIPTION OF THE DRAWINGS

For a fuller understanding of the nature and objects of the invention, reference should be made to the following detailed description taken in conjunction with the accompanying drawings in which:

FIG. 1A is a waveform drawing for illustrating a transfer state of an 8-field continuous GCR signal under a so-called Broadcasting Station Associated Standard utilized in Japan;

FIG. 1B is another waveform drawing for illustrating a transfer state of an 8-field continuous GCR signal;

FIG. 2A is a waveform drawing of the GCR signal detected from FIG. 1A;

FIG. 2B is a waveform drawing of the GCR signal detected from FIG. 1B;

DETAILED DESCRIPTION OF THE PREFERRED EMBODIMENT

Figure 3A:
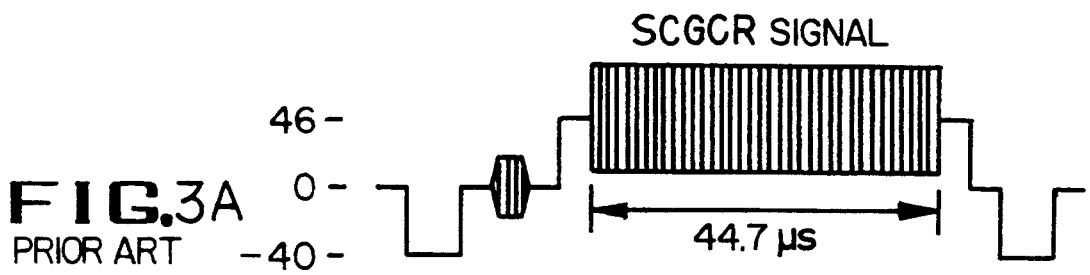
FIGS. 3A and 3B are waveform drawings of the GCR signal enlarged from FIG. 1B.
Figure 3B:
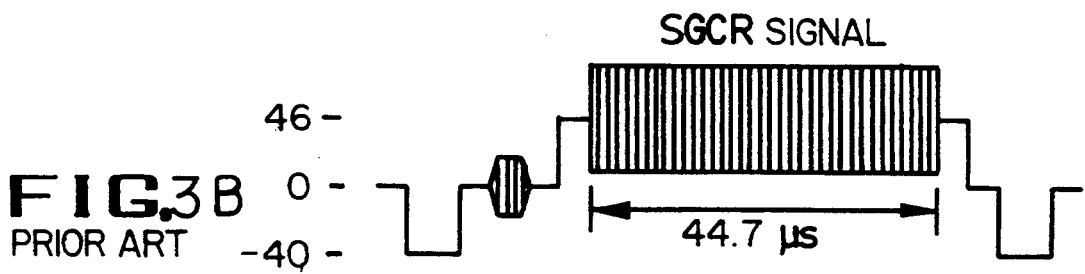
Figure 3C:
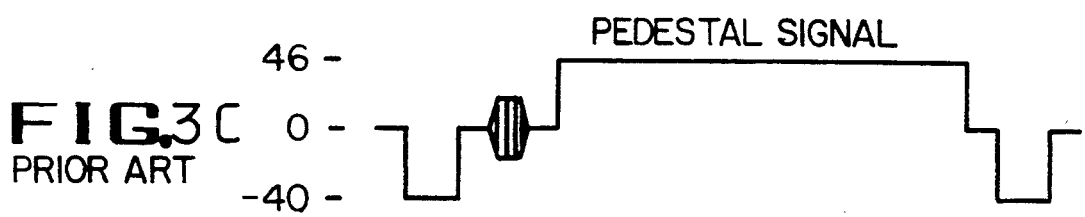
FIG. 3C is a waveform drawing of a pedestal signal enlarged from FIG. 1B.
Figure 4A:
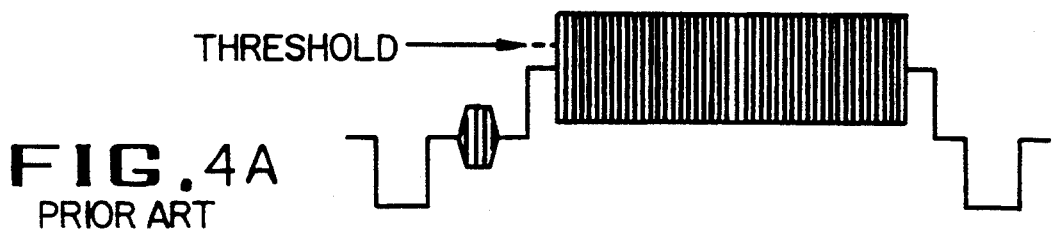
FIGS. 4A-4C are waveform drawings for explaining a conventional method for discriminating a GCR signal.
Figure 4B:
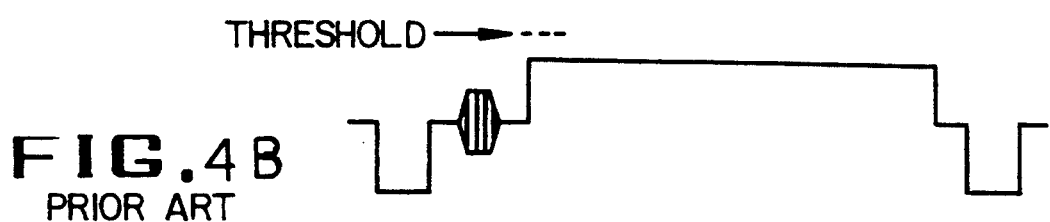
Figure 4C:
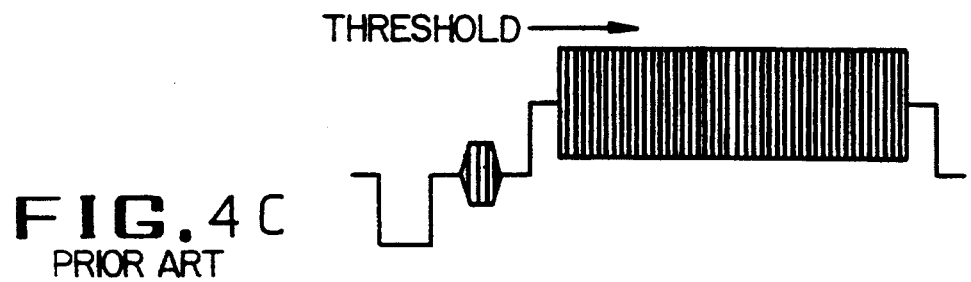

A detecting method of a start signal of a ghost cancelling reference signal in accordance with the present invention comprises the steps of:

obtaining differential values of received GCR signals and differential values of pedestal signals to thereby compare same with predetermined thresholds (first process); and discriminating a GCR signal as a comparison result of the obtaining step when a period during which the differential values are larger than the thresholds is over a predetermined period (second process).

The first process of the above two processes comprises the steps of: obtaining a differential signal between a current image signal and an image signal delayed by one sample, to thereby obtain the differential values of the GCR signals and of the pedestal signals inserted into the 8-field to thereafter be transferred; and comparing a value differentiated from the differentiating step with a predetermined threshold to thereby generate a GCR detecting signal.

The second process comprises the steps of: measuring a period during which the GCR detecting signal is outputted; and outputting a GCR waveform detecting signal when the GCR detecting signal is outputted for over a predetermined period of time at the measuring step.

The aforesaid method will now be explained in more detail.

When the GCR signal and pedestal signal in an incoming image signal are inserted into the 8-field to thereby be broadcast from the transmitting end, the GCR signal and pedestal signal are analyzed at the receiving end.

More specifically, after an incoming image signal is delayed by one sample, a difference between the incoming image signal and the signal delayed by one sample is secured.

The differential values of the resulting GCR signals or of the pedestal signal are compared with a predetermined threshold.

At this moment, the differential value of the GCR signal is larger than the predetermined threshold and the differential value of the pedestal signal becomes smaller than the predetermined threshold.

Accordingly, if the differential value is larger than the threshold, it is discriminated for the moment that the GCR signal has been inputted.

Thereafter, in order to avoid influence by noise, a discrimination is made as to whether the differential value is larger than the threshold for over a predetermined period of time.

If the above discrimination shows that the differential value is larger than the threshold for over the predetermined period of time, then the incoming signal is discriminated as the GCR signal.

If there is noise in the pedestal signal, a differential value of the pedestal signal becomes larger than the predetermined threshold but because the period during which the differential value is larger than the threshold is not over the predetermined period of time, it can be apparent that the differential value is not the GCR signal, but rather the pedestal signal.

As seen in the foregoing, if the GCR signal and pedestal signal are detected, as explained before, a microprocessor calculates an average GCR signal in response to the detected data.

Figure 5:
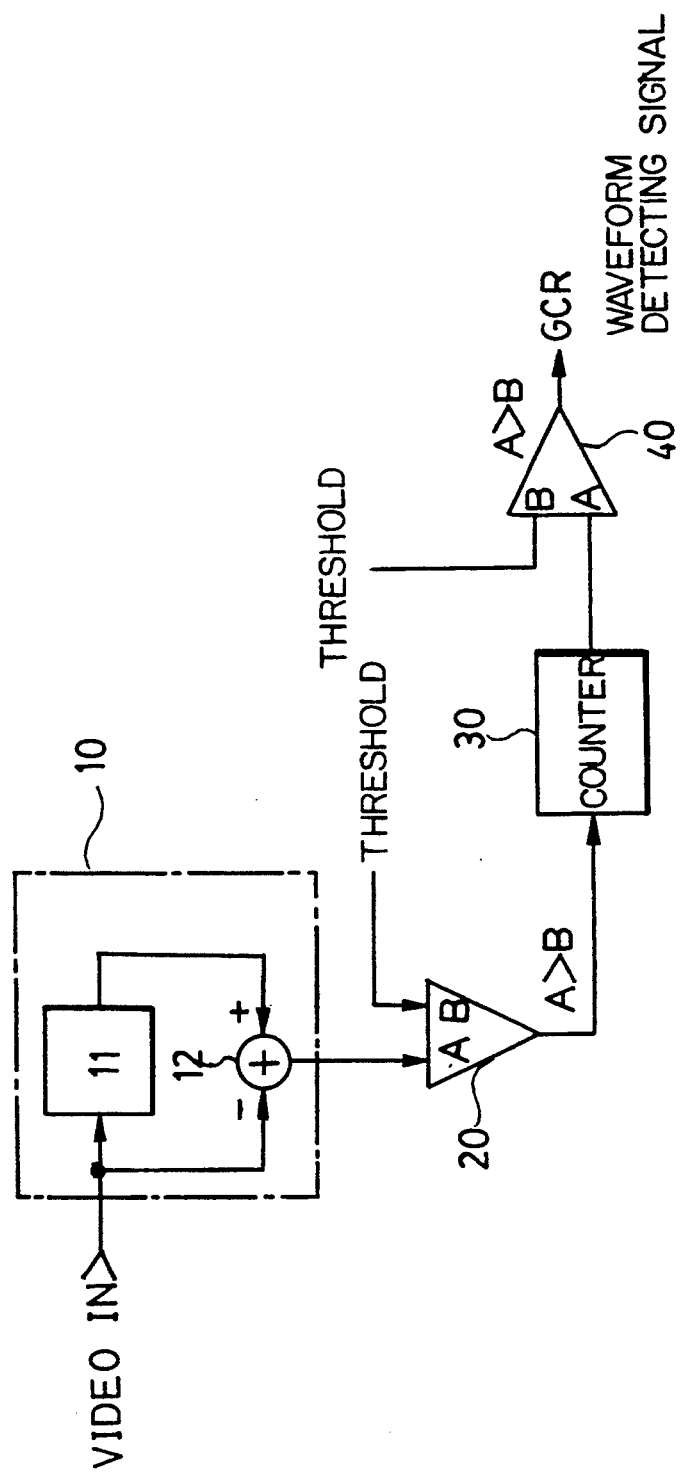
FIG. 5 is a drawing for showing one embodiment of a detecting circuit of a start signal for a GCR signal in accordance with the present invention.

FIG. 5 shows one embodiment of a detecting circuit for detecting a start signal of a GCR signal in accordance with the present invention. The circuit includes means for obtaining differential values of a GCR signals and differential values of pedestal signals in a received image signal to thereby compare the same with predetermined thresholds (first means); and means for discriminating a GCR signal to thereby output a GCR detecting signal as a comparison result of the above first means when a period during which the differential value is larger than the threshold exceeds a predetermined period (second means).

The first means of the above two means comprises: a differential value detecting unit 10 for securing differential values of the GCR signals and differential values of pedestal signals; and a first comparator 20 for comparing the differential values detected from the differential value detecting unit 10 with predetermined thresholds.

The second means comprises: a counter 30 for measuring a period during which the differential value is larger than the predetermined threshold as a comparison result of the first means; and a second comparator 40 for outputting the GCR waveform detecting signal when the differential value is larger than the predetermined threshold for over a predetermined period of time by comparing a period measured from the counter 30 with a predetermined threshold.

The circuit shown in FIG. 5 will now be explained in more detail with reference to the waveforms illustrated in FIGS. 6A–6D.

When the GCR signal and the pedestal signal are inserted into the 8-field to thereby be broadcast from the transmitting end, the differential value detecting unit 10 of the receiving end signals containing the GCR signal and pedestal signal to thereafter output a differential value.

In other words, a sample delayer 11 (FIG. 5) of the differential value detecting unit 10 delays an incoming image signal by one sample and a subtracter 12 of unit 10 secures a difference between the incoming image signal and the signal one sample delayed by the sample delayer 11.

Figure 6A:
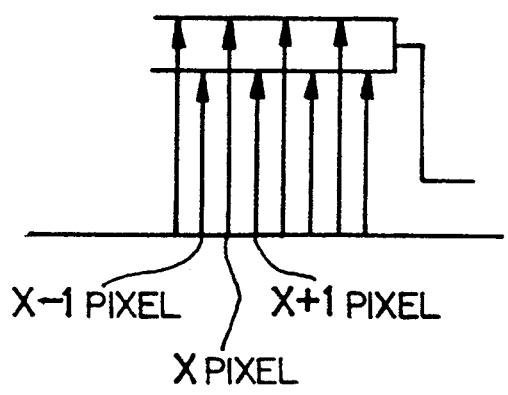
FIGS. 6A-6D are embodiments of waveforms for illustrating an operational state of FIG. 5.
Figure 6B:
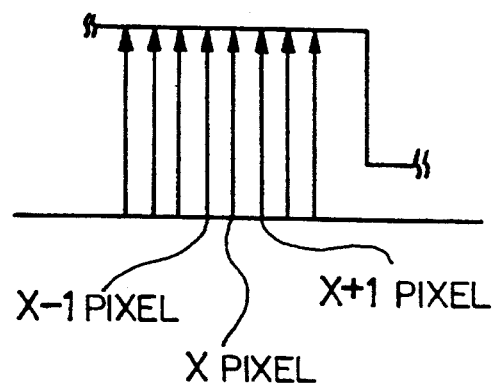

The differential value (the difference signal) outputted from the differential value detecting unit 10 is compared with a predetermined threshold at the first comparator 20. At this moment, if the differential value of the GCR signal as illustrated in FIG. 6A is larger than the predetermined threshold, then the differential value of the pedestal signal, as illustrated in FIG. 6B, becomes smaller than the predetermined threshold.

Accordingly, when the GCR signal is inputted, the first comparator 20 outputs a logic signal having a high level.

Thereinafter, in order to rule out any influence of noise, the counter 30 counts a period during which the differential value is larger than the threshold. The value counted from the counter 30 is then compared with a threshold at the second comparator 40.

If the value counted from the counter 30 is larger than the threshold as a comparison result from the second comparator 40, the incoming signal is considered to be a GCR signal.

Figure 6C:
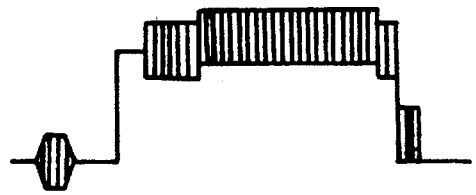

Accordingly, even if a GCR signal deformed by the ghost as illustrated in FIG. 6C is inputted, the incoming signal is accurately detected as the GCR signal.

Figure 6D:
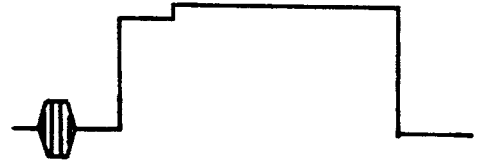

If noise occurs on the pedestal signal, then the value of the pedestal signal becomes larger than the predetermined threshold, as illustrated in FIG. 6D; however, because the period where the differential value is larger than the threshold can not be over the predetermined period of time, it can be discriminated that the differential value is not the GCR signal, but rather the pedestal signal.

As seen from the foregoing, when the GCR signal and pedestal signal are detected, the microprocessor (not shown) calculates the average GCR signal in accordance with the detected data.

Figure 7:
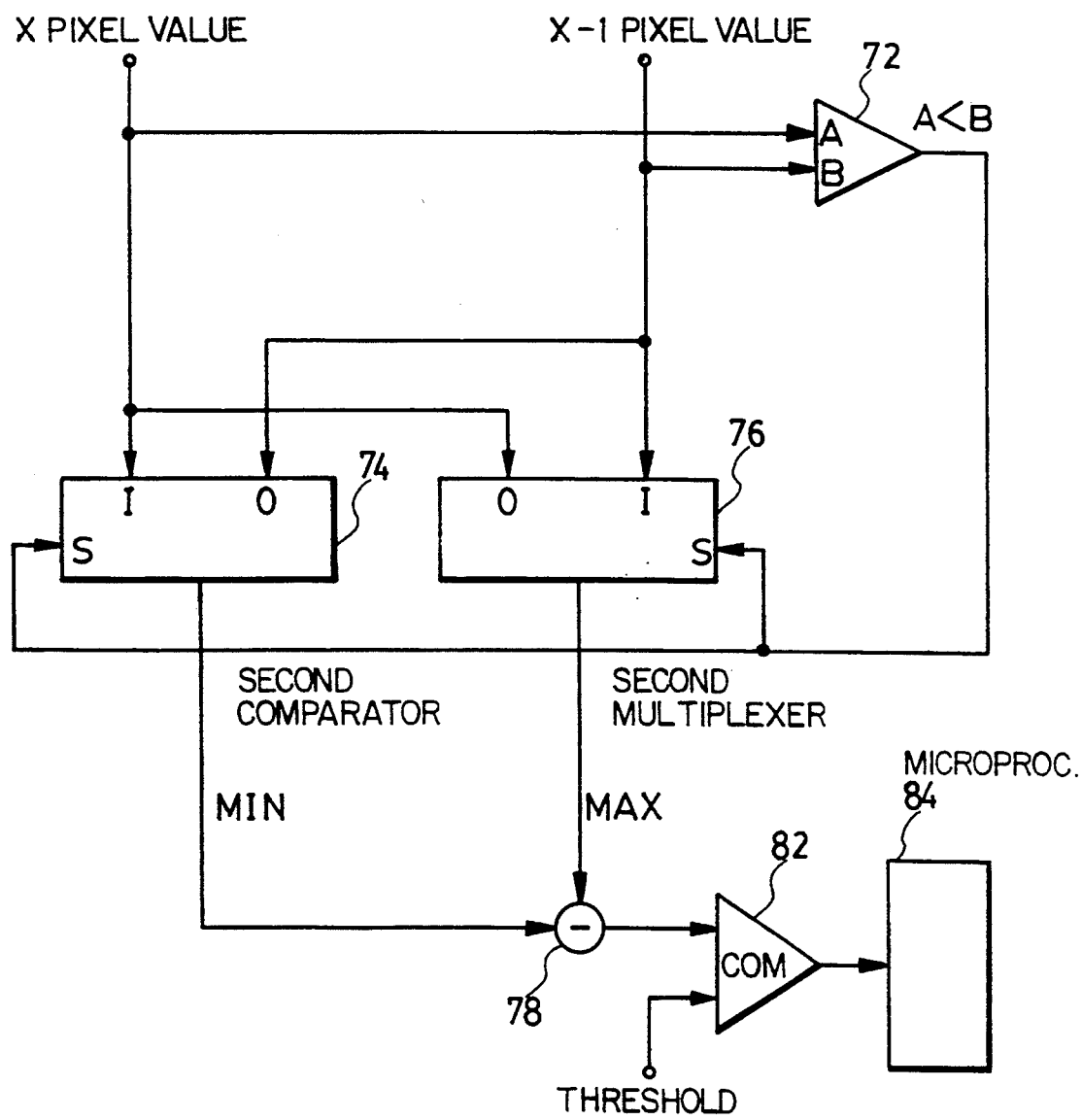
FIG. 7 is a drawing for illustrating another embodiment of a detecting circuit for detecting a start signal of a GCR signal in accordance with the present invention.

FIG. 7 is a circuit diagram for illustrating another embodiment of a detecting circuit for detecting a start signal of a GCR signal in accordance with the present invention. The circuit shown in FIG. 7 comprises: a difference signal detecting means for securing a difference between a maximum value and a minimum value among surrounding pixel values; and a signal discriminating means for between a GCR signal and a pedestal signal in accordance with a difference signal detected from the difference signal detecting means.

In the above construction, the difference signal detecting means comprises: a first comparator 72 for comparing magnitudes of surrounding pixel values; a first multiplexer 74 for outputting a small value in accordance with a comparison result of the first comparator 72; a second multiplexer 76 for outputting a large value in accordance with the comparison result of the first comparator 72; and subtracter 78 for securing a difference between the values of the first and second multiplexers 74 and 76.

The signal discriminating means comprises: a second comparator 82 for comparing the difference between the small value and large value outputted from the difference signal detecting means with a threshold; and a microprocessor 84 for ascertaining the average GCR signal by classifying the GCR signal and the pedestal signal in accordance with the comparison result of the second comparator 82. The operation of the circuit shown in FIG. 7 will now be explained.

First of all, one pixel value (x pixel value) and a surrounding pixel value (x−1 pixel value or x+1 pixel value) are inputted to the difference signal detecting means.

For purposes of explanation, the x+1 pixel value is taken as an example for the surrounding pixel value.

The pixel values (x, x+1) are inputted to the first comparator 72 and at the same time are inputted to the first and second multiplexers.

The first comparator 72 compares the inputted pixel values (x, x+1) to thereby output a logic signal having a high level if an input at input A is smaller than that of the other input B (i.e., A<B).

The first multiplexer 74 outputs the smaller value of the inputted pixel values (x, x+1) in accordance with an output of the first comparator 72.

The second multiplexer 76 outputs the larger value of the inputted pixel values (x, x+1) in accordance with an output of the second comparator 74.

The second subtracter 78 obtains a difference between the smaller value and the larger value from the first and second multiplexers 74 and 76, respectively, to thereafter output same.

The difference signal outputted from the second subtracter 78 is compared with the threshold of the second comparator 82 of the signal discriminating means. The second comparator 82 outputs a logic signal having a high level if the difference between the smaller value and the larger value is larger than the threshold.

The microprocessor 84, if a logic signal having a high level is outputted for over a predetermined period of time from the second comparator 82, discriminates same as a GCR signal, and if a logic signal having a low level is inputted, microprocessor 84 discriminates same as a pedestal signal.

Accordingly, the microprocessor 84 obtains an average GCR signal in response to the discriminated data as explained above.

As seen from the foregoing, the detecting method for detecting a start signal of the GCR signal and a circuit thereof in accordance with the present invention can accurately detect the start signal to thereby cancel a ghost even if the GCR signal and pedestal signal are distorted.

Although the invention has been described in detail with reference to preferred embodiments, it will be understood by those of ordinary skill in the art that various modifications can be made, without departing from the spirit and scope of the invention.

What is claimed is:

1. A detecting method for detecting a start signal of a ghost cancelling reference signal comprising the steps of:
    a first step of obtaining differential values of received GCR signals and differential values of pedestal signals and comparing the differential values with a predetermined threshold to provide comparison results;
    a second step of identifying GCR signals from the comparison results of said first step whenever a period during which the differential values are larger than the predetermined threshold exceeds a predetermined period; and
    outputting and processing the identified GCR signals to determine which among the GCR signals is the start signal.

2. The detecting method for detecting a start of a ghost cancelling reference signal as defined in claim 1, wherein said first step includes the steps of:
    obtaining a differential signal between a current image signal and an image signal delayed by one sample, to thereby obtain the differential values of the received GCR signals and of the pedestal signals inserted into an 8-field continuous ghost cancelling reference signal; and
    comparing the differential values with the predetermined threshold to thereby generate a GCR detecting signal.

3. The detecting method for detecting a start signal of a ghost cancelling reference signal as defined in claim 2, wherein said second step includes the steps of:
    measuring a period during which the GCR detecting signal is outputted; and
    outputting a GCR waveform detecting signal when the measured period exceeds a predetermined period of time.

4. A detecting circuit for detecting ghost cancelling reference signals comprising:
    first means for obtaining differential values of received GCR signals and differential values of pedestal signals, for comparing the differential values with a predetermined threshold, and for outputting comparison results; and
    second means for receiving the comparison results of said first means, for determining if a period during which the differential values are larger than the threshold exceeds a predetermined time period, and for outputting a GCR detecting signal whenever the period does exceed the predetermined time period.

5. The detecting circuit for detecting ghost cancelling reference signals as defined in claim 4, wherein said first means comprises:
    a differential value detecting unit for detecting the differential values of the GCR signals and the differential values of the pedestal signals; and
    a comparator for comparing the differential values detected from the differential value detecting unit with the predetermined threshold.

6. The detecting circuit for detecting ghost cancelling reference signals as defined in claim 5, wherein said differential value detecting unit comprises:
    a sample delayer for delaying an incoming image signal by one sample; and
    a subtracter for securing a difference between the signal delayed by the sample delayer and a currently-inputted image signal.

7. The detecting circuit for detecting ghost cancelling reference signals as defined in claim 4, wherein said second means comprises:
    a counter for counting the period during which the differential values are larger than the predetermined threshold upon receiving the comparison results from said first means; and
    a comparator for outputting a GCR waveform detecting signal if the differential values are larger than the predetermined threshold for over the predetermined time period, by comparing the period counted by said counter with a further threshold.

8. A detecting circuit for detecting a start signal of a ghost cancelling reference signal comprising:
    a difference signal detecting means for ascertaining a difference between a maximum value and a minimum value among surrounding pixel values; and
    a signal discriminating means for discriminating a GCR signal and a pedestal signal in accordance with the difference signal detected from the difference signal detecting means and for determining which among the GCR signals is the start signal.

9. The detecting circuit for detecting a start signal of a ghost cancelling reference signal as defined in claim 8, wherein the difference signal detecting means comprises:
    a first comparator for comparing magnitudes of surrounding pixel values and outputting a comparison result;
    a first multiplexer for outputting the minimum value in accordance with the comparison result of said first comparator;
    a second multiplexer for outputting the maximum value in accordance with the comparison result of said first comparator; and
    a subtracter for ascertaining a difference between the outputted values of said first and second multiplexers.

10. A detecting circuit for detecting ghost cancelling reference signals comprising:
    a differential value detecting unit arranged to (a) receive an incoming image signal and a delayed image signal, (b) process the image signal by calculating a differential value between the incoming image signal and the delayed image signal, and (c) output a difference signal;
    a first comparator having respective inputs for the difference signal and a predetermined threshold signal, whereby said first comparator outputs a comparison result signal in accordance with a comparison performed between the difference signal and the threshold signal; and
    a counter having an input for the comparison result signal, said counter determining a duration of the comparison result signal; and
    a second comparator having respective inputs for the comparison result signal and a further threshold signal, whereby said second comparator outputs a ghost cancelling reference waveform detecting signal in accordance with a comparison performed between the comparison result signal and the further threshold signal.

* * * * *